United States Patent [19]
Kaldenback et al.

[11] 3,759,282
[45] Sept. 18, 1973

[54] ULTRA-HIGH VACUUM ISOLATION VALVE FOR VOLATILE MATERIALS

[75] Inventors: Kenneth H. Kaldenback; John Kovals; John H. Pollard, all of Alexandria, Va.

[73] Assignee: The United States of America as represented by the Secretary of the Army, Washington, D.C.

[22] Filed: Oct. 30, 1972

[21] Appl. No.: 302,165

[52] U.S. Cl.............. 137/68, 137/70, 137/797, 251/335 B, 251/368
[51] Int. Cl............................................. F16k 17/40
[58] Field of Search.................. 137/797, 68, 69, 137/70, 71; 251/335 A, 335 B, 368

[56] References Cited
UNITED STATES PATENTS

| | | | |
|---|---|---|---|
| 2,937,654 | 5/1960 | Wilner | 137/68 |
| 3,159,377 | 12/1964 | Samour | 251/368 X |
| 3,195,552 | 7/1965 | Rasmussen | 251/368 X |
| 3,202,199 | 8/1965 | Wood | 137/71 X |
| 3,209,937 | 10/1965 | Hirst et al. | 137/70 X |
| 3,266,505 | 8/1966 | Kron | 251/368 X |
| 3,391,901 | 7/1968 | Wheeler et al. | 251/368 X |
| 3,512,556 | 5/1970 | McKhann | 137/71 |
| 3,573,863 | 4/1971 | Doors et al. | 251/335 B |
| 3,590,839 | 7/1971 | Moore | 137/71 |
| 3,727,406 | 4/1973 | Lefeuvre | 251/335 B |

Primary Examiner—Samuel Scott
Attorney—Harry M. Saragovitz et al.

[57] ABSTRACT

An ultrahigh vacuum isolation valve comprising a housing having a side tube containing a frangible vial of volatile material and a linear motion feedthrough mechanism in the housing with an enlarged flange portion for rupturing the vial as the valve is opened. A deformable copper seal is held by a retaining screw at a distal end of the linear feedthrough whereat a valve orifice having inclined valve seating surfaces is located.

1 Claim, 2 Drawing Figures

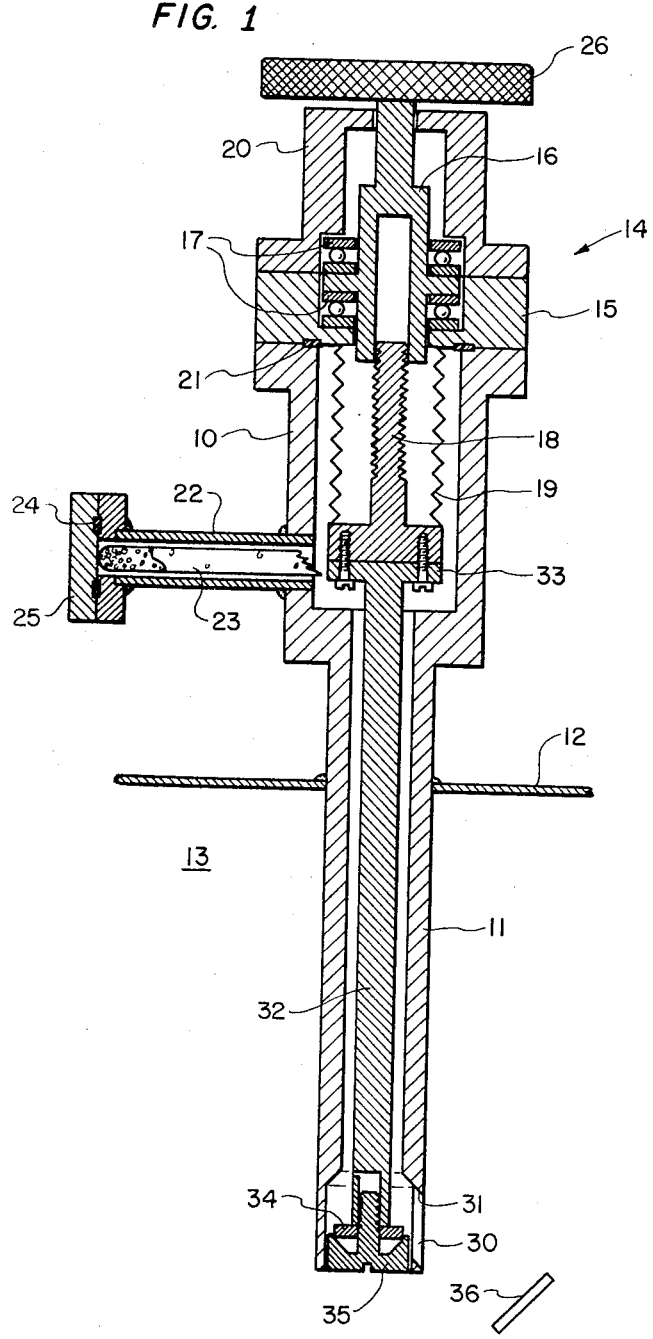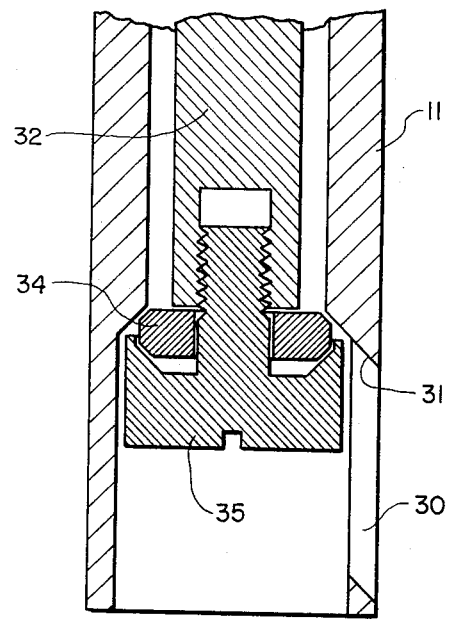

ULTRA-HIGH VACUUM ISOLATION VALVE FOR VOLATILE MATERIALS

The invention described herein may be manufactured, used, and licensed by or for the Government for governmental purposes without the payment to me (or us) of any royalty thereon.

Cesium is the metal most commonly used in photocathode technology to activate photoemissive materials in order to obtain a low work function surface and, thereby achieve efficient photoemission. Only a small amount of cesium, approximately one monolayer or $10^{15}$ atoms per square centimeter, at the photocathode surface is necessary to do this. Hence, a controllable and reproducible source of cesium flux is of significant practical interest and importance.

All photocathodes are processed under ultrahigh vacuum conditions and it is desirable that any cesium source operate under the lowest possible pressure and be controllable while maintaining that pressure. It is also desirable that the cesium source be sealable to ultrahigh vacuum thus avoiding the necessity of changing the cesium whenever the main chamber is brought up to ambient pressure for specimen changes.

Known prior art devices suffer from the inability to be sealable to ultrahigh vacuum and must be heated to temperatures well over 100°C to obtain a useful cesium flux during operation.

The valve described herein incorporates the desirable features of both an ultrahigh vacuum sealing capability and a useable flux rate at room temperature.

SUMMARY OF THE INVENTION

The disclosed device is a molecular cesium source capable of producing a cesium flux at room temperatures and capable of repeated use through numerous pressure cycles from ambient to ultrahigh vacuum without cesium contamination. The valve sealing is accomplished using an OFHC copper seal that deforms and engages a conical valve seating surface at the valve orifice.

BRIEF DESCRIPTION OF THE DRAWINGS

FIG. 1 shows a cross-sectional view of the cesium isolation valve.

FIG. 2 is an enlarged view of the valve closure showing the deformable copper seal.

DESCRIPTION OF THE PREFERRED EMBODIMENT

As seen in FIG. 1, the device comprises an enlarged main body section 10 and a narrower tubular extension 11 which extends through the wall 12 of a vacuum chamber 13. The main body 10 is joined to a conventional linear motion feedthrough made up of a screw guide flange 15, drive mechanism 16, thrust bearings 17, drive screw 18 surrounded by sealing bellows 19 and bearing housing 20. The linear motion feedthrough mechanism is sealed to the main body 10 with a conflat seal 21. A knob 26 is fixed to the drive mechanism 16.

A side tube 22, extending from the main body 10 houses a cesium vial 23. The side tube 22 is sealed by a miniconflat seal 24 and cap 25.

A valve orifice 30, located at the end of the tube 11 has a conical valve seating surface 21 inclined at about 45° to the axis of the tube. A shaft 32 with a flange 33 is bolted to the linear feedthrough screw 18. The closure for the valve orifice 31 shown in FIG. 1, and shown enlarged in FIG. 2, is made up of an OFHC copper seal 34 held on the shaft 32 by a retaining screw and seal 35. As can be seen in FIG. 2, the copper seal 34 is drawn back against the conical valve seating surface 31 and is deformed as shown thereby creating an ultrahigh vacuum seal.

OPERATION OF THE CESIUM ISOLATION VALVE

The initial valve seating during final valve assembly is accomplished by torquing the drive mechanism to 18 ft lbs; followed by a retightening of the retaining screw 35 into the shaft 32 thereby locking the copper gasket in place. Subsequent sealing to ultra-high vacuum only requires 15 ft lbs of torque on the drive mechanism. The valve is normally heliarc welded on a rotatable flange (a portion of which is shown at 12) and is positioned to give line of sight from the sample surface 36, being activated, to the interior of the valve through the valve orifice 30. The cesium vial 23 is introduced into the side tube 22 and sealed with the miniconflat seal 24 and cap 25; with the valve orifice 30 in a partially open position. The complete valve and vacuum system is pumped down and baked for 24 hours at 200°C and allowed to cool to attain ultrahigh vacuum conditions of $10^{-10}$ torr pressure or lower. The valve is now fully opened breaking the vial 23 and releasing cesium into the main body 10 of the valve. With the valve then closed, cesium is vacuum distilled uniformly upon the interior surfaces of the valve by gently heating the external portions of the valve with a heating tape. Upon subsequent cooling the valve is ready for use.

RESULTS OF VALVE USE

1. The valve seals consistently to $10^{-10}$ torr or better. One particular valve has operated satisfactorily for a full year without replenishment of the cesium in a research system.

2. Opening and closing the valve does not increase the system pressure by greater than $2 \times 10^{-11}$ torr during use; resulting in a cesium source free of gaseous contamination.

3. Line of sight mass spectrometry tests showed the only detectable impurity to be 25 parts per million of rubidium.

4. The mass spectrometer has been used to calibrate the source flux rate. The rate with the valve at room temperature was $10^{12}$ atoms/cm²/sec at a sample surface 4 centimeters from the valve axis at the valve orifice. This value is in agreement with calculations of the flux from simple kinetic theory using published values for the vapor pressure of cesium metal.

5. Auger spectroscopy measurements of the cesiated surface show the flux rate to be consistently reproducible.

ADVANTAGES OF THE VALVE

1. The valve provides ultrahigh vacuum sealing allowing the vacuum system to be brought up to ambient pressure without necessitating a change of cesium.

2. The cesium source is highly pure and needs no outgassing.

3. The source operates at room temperature providing a monolayer coverage of the sample in ten minutes.

4. Outgassing problems associated with high temperature operation are avoided completely.

5. The source need only be charged with cesium once.

6. The cesium flux rate can be accurately and practically instantaneously controlled.

7. Experimental tests show the flux rate is completely reproducible.

While a preferred embodiment of the invention has been described, it should be understood that variations thereof, substitutions and alterations, such as the use of other volatile materials in place of cesium, can be made without departing from the scope of the invention as defined by the following claim.

We claim:
1. An ultrahigh vacuum isolation valve comprising:
a housing having an enlarged main body and an elongated narrow tubular extension thereon;
a linear motion feedthrough sealedly affixed to the enlarged main body and having a drive screw extending therein;
a sealable side tube extending laterally from said main body for housing a sealed frangible vial of volatile material and so positioned that the head of said drive screw will break the vial as it advances to an open valve position;
a laterally placed valve orifice at the distal end of the tubular extension, said orifice having a conical valve seating surface;
a shaft affixed to the head of said drive screw and carried in the tubular extension;
valve orifice sealing means including a deformable copper disc on the end of said shaft, said copper disc being retained on said shaft by a retaining screw and seal member and being engageable with said conical valve seating surface for sealing said valve to ultrahigh vacuum.

* * * * *